Jan. 18, 1949.　　　T. A. BAKER　　　2,459,303
FLUID METERING SYSTEM
Original Filed May 12, 1942　　　3 Sheets-Sheet 1
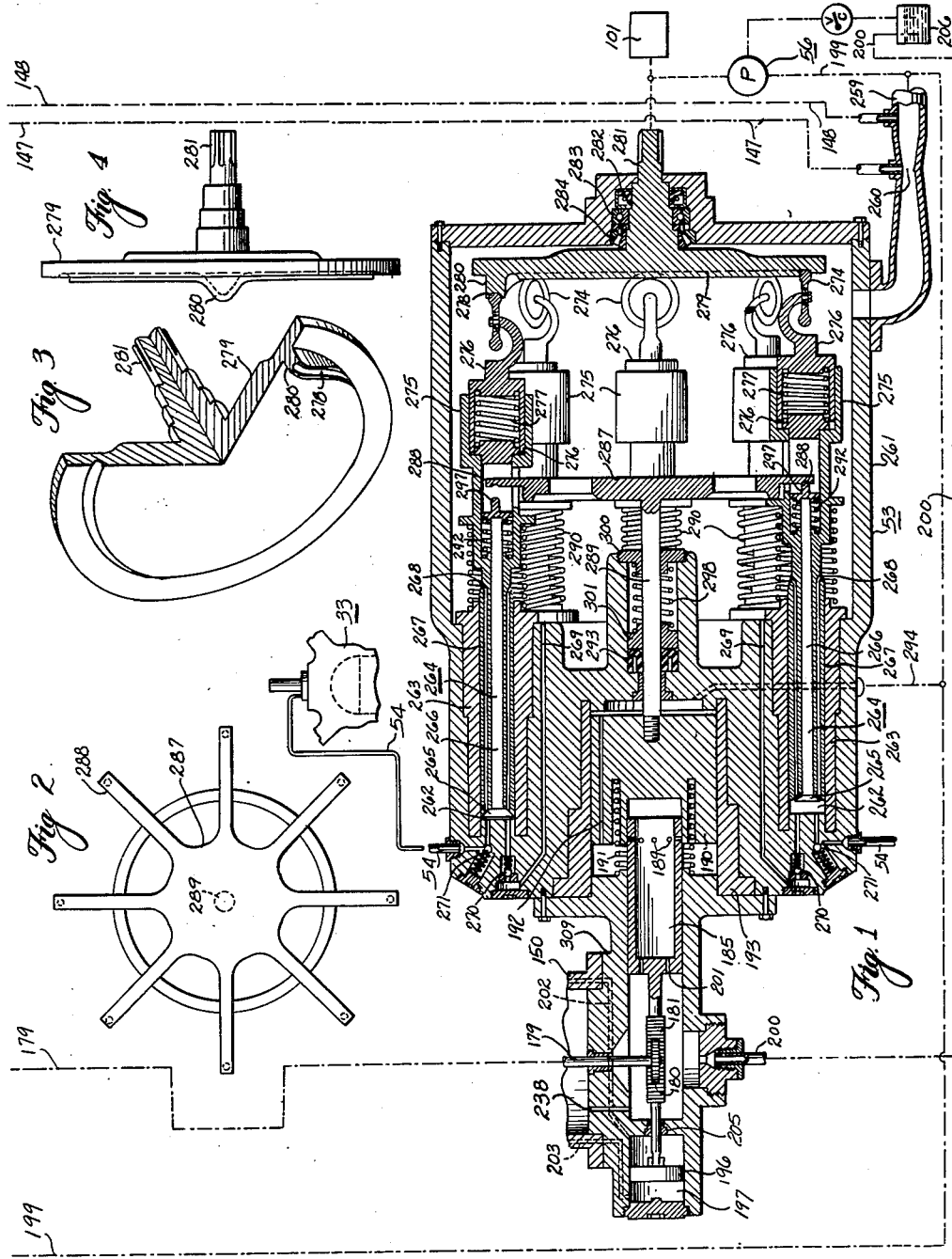
INVENTOR.
THOMAS A. BAKER
BY
Woodling and Krost
attys Jan. 18, 1949.  T. A. BAKER  2,459,303
FLUID METERING SYSTEM Original Filed May 12, 1942  3 Sheets-Sheet 2

INVENTOR.
THOMAS A. BAKER
BY
Woodling and Krost
attys

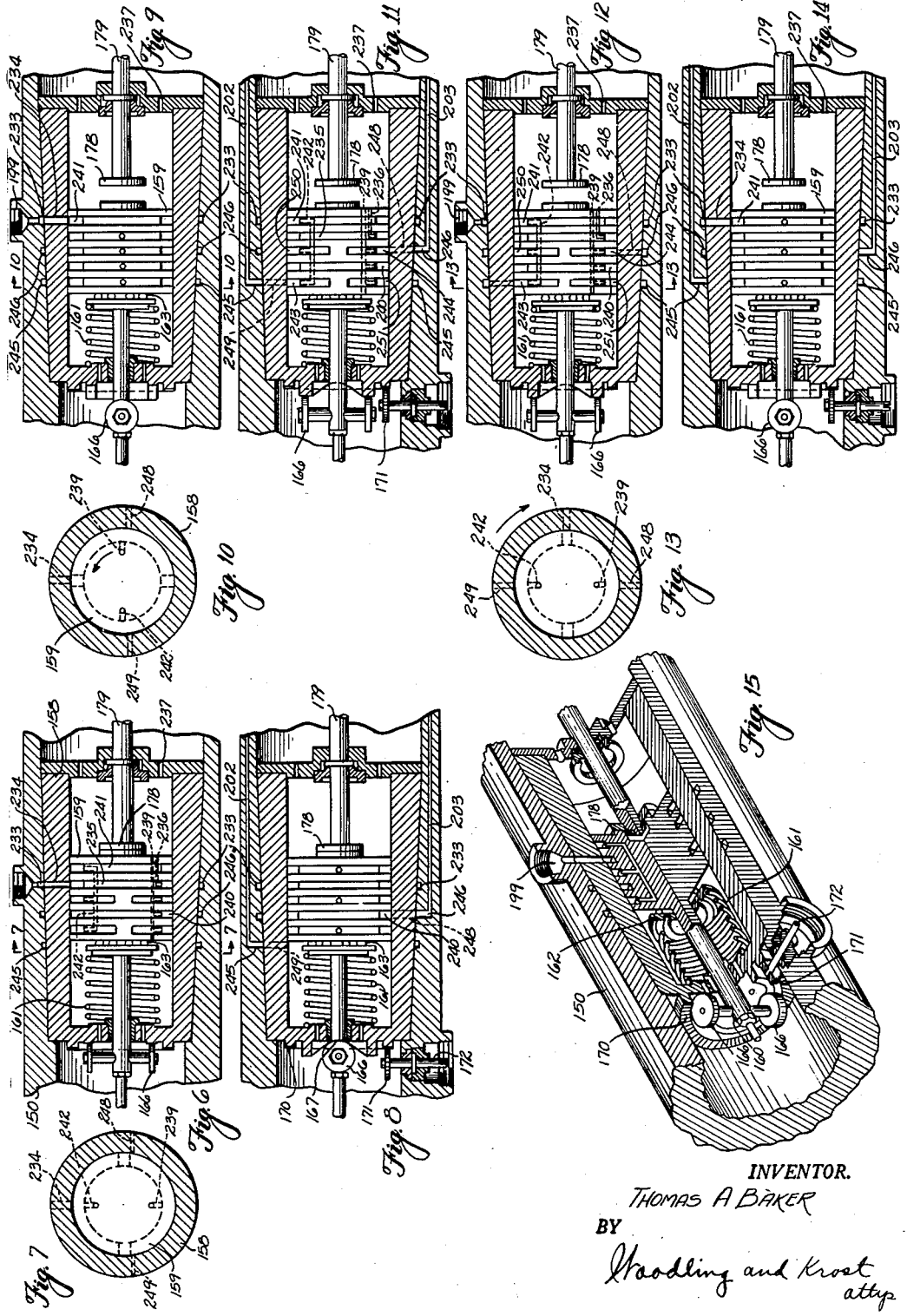

Patented Jan. 18, 1949

2,459,303

UNITED STATES PATENT OFFICE 2,459,303

FLUID METERING SYSTEM

Thomas A. Baker, Logansport, Ind.

Original application May 12, 1942, Serial No. 442,711. Divided and this application December 24, 1942, Serial No. 470,014

7 Claims. (Cl. 103—37)

This application is a division of my application, Serial No. 442,711, filed May 12, 1942, Patent No. 2,375,204, for Fluid measuring and regulating mechanism, and relates in general to fluid system and more particularly to a liquid metering system or control apparatus for regulating the flow of liquid in response to a changed condition of the liquid or to an operable controlled condition.

Although my invention will be described with the provision of maintaining the flow of the liquid in a liquid passage at a predetermined value or setting, it is to be understood that it may be applied to govern the operation of any other condition.

An object of my invention is the provision of measuring the quantity of liquid delivered through a flow duct passage.

Another object of my invention is the provision of measuring the quantity of liquid which flows through a liquid duct passage and of maintaining the flow of liquid through the liquid duct passage at a predetermined value or setting.

Another object of my invention is the provision for compensating for temperature changes in the liquid while measuring or determining the quantity of the flow of liquid through a liquid duct passage.

Another object of my invention is the provision of using the pressure of the liquid flowing in the liquid duct passages for operating a motion transmitting means between the liquid measuring device and the control means which governs the amount of liquid flowing through the air duct passage.

Another object of my invention is the provision of transmitting a movement which is responsive to the flow of liquid through a conduit to a liquid metering device or other control mechanism, whereby the quantity of the flow of the liquid through the conduit may be maintained at a predetermined value or setting, as determined by an operable controlled condition.

Other objects and a fuller understanding of my invention may be had by referring to the following description and claims, taken in conjunction with the accompanying drawings, in which like parts are designated by like reference characters and, in which:

Figure 1 is a cross-sectional view of my liquid metering device which is adapted to control the quantity of the liquid flowing through the liquid duct passage;

Figure 2 is a front view of a movable metering plate arranged to govern the quantity of liquid passing through the liquid metering device;

Figure 3 is a perspective and partially cross-sectional view of a cam race-way employed in my liquid metering device;

Figure 4 is a side view of the cam race-way shown in Figure 3;

Figure 6 is a cross-sectional view of a valve for controlling the fluid in my motion transmitting means;

Figure 7 is an end view showing the angular relationship between the valve plunger and the valve casing taken along the line 7—7 of Figure 6 with the outside casing removed;

Figure 8 is a view of the valve shown in Figure 6 but looking down thereon;

Figure 9 is a view similar to Figure 6 but shows the plunger within the valve turned in a counter-clockwise direction for substantially 90 degrees;

Figure 10 is a cross-sectional view taken along the line 10—10 of Figure 9 with the outer casing removed;

Figure 11 is a view of the position of the valve shown in Figure 9 but looking down thereupon;

Figure 12 is a view similar to Figure 6 but with the inner casing rotated substantially 90 degrees in a clockwise direction;

Figure 13 is a cross-sectional view of Figure 12 taken along the line 13—13 with the outer casing removed;

Figure 14 is a cross-sectional view of the valve shown in Figure 12 but looking down thereupon;

Figure 15 is a perspective and cross-sectional view of the valve shown in Figures 6 to 15 inclusive.

Figure 16:
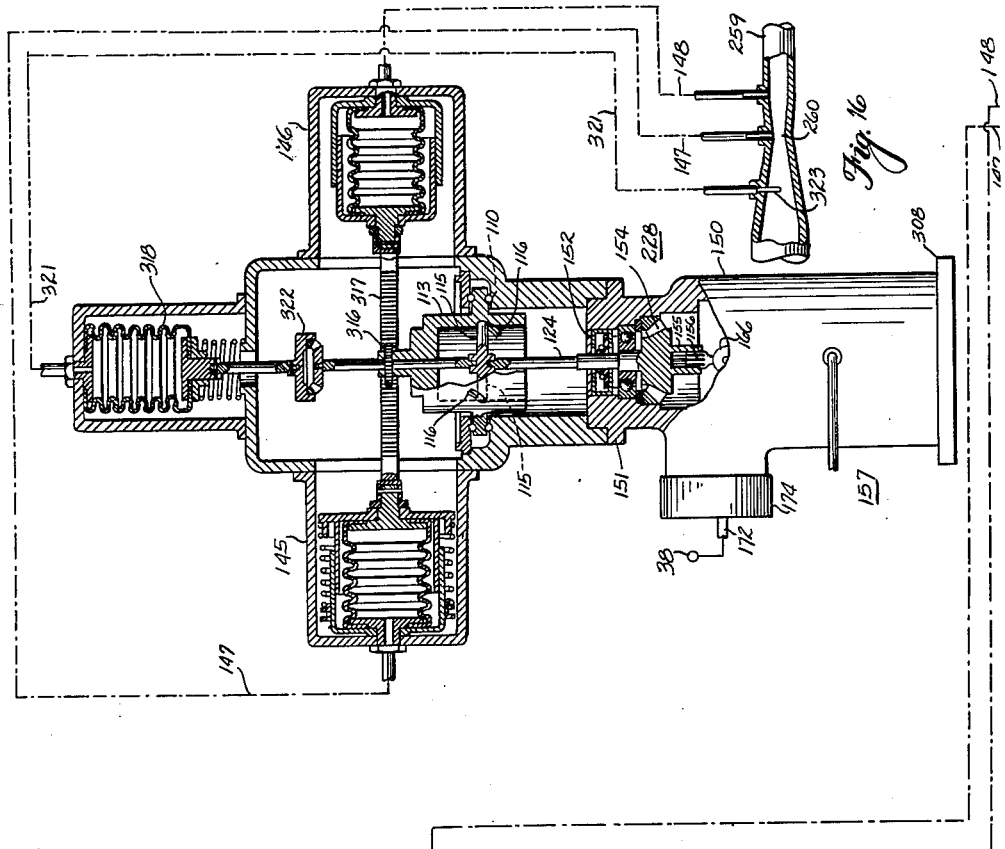
Figure 16 is a modified form of the motion transmitting means shown in Figure 5 in that a temperature responsive device has been added thereto.

The liquid or fuel which is delivered to the internal combustion engine 33 through the supply conduit 54 is fed by a pump 56 from a supply tank 206. In Figure 1 of the drawing only one cylinder of the internal combustion engine is illustrated and it is to be understood that the other cylinders of the engine are supplied with fuel. The fuel upon leaving the pump passes through a venturi 260 and then into a liquid metering or measuring device indicated generally by the reference character 53, after which the measured liquid is supplied to the cylinder 33 through a supply duct 54. Although only one outlet 54 is illustrated for the liquid metering device, it is to be understood that the liquid metering device has as many outlets as there are cylinders in the engine to be supplied. The liquid metering device 53 and the pump 56 may be driven by a common source of motive power indicated generally by the reference character 101. The liquid metering device 53 is capable of having a variable volume delivery which governs the flow of the amount of fluid to the cylinders of the internal combustion engine. The variable volume delivery of the liquid metering device is controlled by a motion transmitting means 228 which in turn is responsive to two opposing pressure bellows 145 and 146, each being respectively responsive to the low and high pressure condition at the venturi 260. The motion transmitting means 228 is governed by the throttle device 38 driving the gear 171. Consequently, the combined action of the liquid metering device 53 and the motion transmitting means 228 provide for maintaining the flow of fluid to the cylinder 33 of the predetermined value or quantity as governed by the setting of the throttle 38.

The liquid metering device 53 comprises a housing 261 which is supplied by liquid fuel from the pump 56 through a feed pipe 259. Within the housing 261 there are arranged a plurality of annularly positioned cylinders indicated generally by the reference character 262. In the embodiment shown in Figure 1 there are eight of such annularly arranged cylinders 262. The cylinders 262 are formed by cylindrical sleeves 263 fitting into the housing 261. Within the cylindrical sleeves 263, I provide valve-like pistons 264 which govern the amount of fluid delivered to the internal combustion engine through the conduit 54. The valve-like piston 264 comprises a valve 265 having a stem 266 and a valve sleeve 267 on the outside of the valve stem 266. Each of the valve sleeves 267 is provided with a longitudinal duct 268 to direct fuel into the left-hand end of the cylinders 262. In addition, fluid may flow into the cylinder 262 through longitudinal ducts 269 passing through the internal body part of the liquid metering device. The fluid which flows through the longitudinal ducts 269 is required to pass by ball check valves 270 before entering the cylinders 262. The fluid which is ejected from the cylinders 262 upon the valve-like piston 264 moving to the left is ejected by the ball check valve 271 before entering the conduit 54 to the cylinder of the internal combustion engine.

The valve sleeve 267 extends to the right and is provided upon its right-hand end with a socket 275 which receives an actuating member 276 operated by a wheel 274 by a rotating plate 279. The wheels 274 are constrained against the rotating plate by means of springs 277 positioned inside of the actuating members 276. As shown best in Figures 3 and 4, the rotating plate 279 is provided with a circular race-way 278 having a raised portion or cam 280 which when a wheel 274 rides thereover actuates an actuating member 276 to the left. When the left-hand end of the actuating members 276 engages the bottom of a socket 275, the movement of the wheel 274 is transmitted to the valve sleeve 267, preparatory to ejecting the fluid from the cylinders 262. The rotating plate 279 is driven by a drive shaft 281 which may be rotated by any suitable motive power means as indicated by the reference character 101. The drive shaft is sealed by means of a shaft seal 282. A ball bearing 283 supports the drive shaft 281 and a thrust bearing 284 prevents axial movement of the drive shaft 281 to the right.

The valve stem 266 is controlled by a positionable plate 287 having fingers 288 extending radially therefrom for engaging the caps 297 which rest upon the right-hand ends of the valve stems 266. The caps 297 are anchored to the valve stems 266 and springs 292 are arranged to bias the valve stems 266 to the right. The positionable plate 287 is connected to a follower plunger 190 by means of a shaft 289. Springs 290 are provided to urge the valve sleeves 267 to the right. The shaft 289 is sealed from the follower plunger 190 by means of a shaft seal 293. The shaft seal is constrained against the shaft by means of a spring 298 which resides between a movable cap 301 and a threaded cap 300. The position of the positionable plate 287 is governed by the follower plunger 190 which in turn is controlled by a pilot plunger 185 having pilot valve openings 189. The pilot plunger 185 is governed by a pilot piston 196 and by a master valve 157 which is a part of the motion transmitting means 228 shown in Figure 5. The master valve 157 controls the pilot piston 196 as will be explained later. The shaft 179 of the motion transmitting means 228 of Figure 5 has a pinion gear 180 anchored on the end thereof and is arranged to mesh with rack teeth 181 for holding the pilot plunger 196 in a fixed position when the master valve 157 is in its neutral or normal position. The housing 150 of the motion transmitting means 228 is provided with a flange 308 and is arranged to be connected to the housing 309 which encloses the pilot plunger 185 and which is connected to the central body portion of the housing 261 of the liquid metering device 53. Fluid under pressure from the pump is admitted to the master valve 157 through a pipe 199 and the flow of the fluid to and from the master valve 157 to the opposite side of the pilot piston 196 is caused to pass through ducts 202 and 203. The rollers 166 and the shaft 160 that control the slidable and rotatable position of the plunger 159 of the master valve 157 are actuated by a gear 316 which meshes with the rack teeth 317 having the ends thereof respectively connected to the pressure actuating devices 145 and 146. The pressure responsive device 145 is connected to the low pressure side of the venturi 260 in the feed pipe 259 through a pipe 147 and the pressure responsive device 146 is connected to the high pressure of the venturi 260 through a pipe 148. The differential pressure between the two responsive devices 145 and 146 is a function of the quantity of liquid or fuel flowing from the pump 56 to the metering device 53 but for the rotating movements of the shaft 179 which holds the pilot plunger 185 in a fixed position is a function of the stabilized flow of the fluid through the pipe 259 into the liquid metering device 53. Inasmuch as the motion transmitting means 228 is effective in producing a movement which corresponds to a function of the fluid through the venturi 260 and inasmuch as the motion transmitting means 228 controls the position of the follower plunger 190 as governed by the pilot valve openings 189, the position of the positionable plate 287 is likewise governed by the fluid flowing through the venturi 260. The position of the positionable plate 287 controls the point at which the valve stem 266 upon the left-hand end of the valve stem 266 closes to begin to eject fuel from the cylinders 262. In other words, it is not until the valve sleeve 267 engages the valve 265 that the fluid is entrapped in the cylinders 262 at which point the ejection is initiated for measuring the quantity of fuel ejected by each movement of the valve-like piston 264. The farther that the positionable plate 287 is to the right the larger the volume of liquid ejected upon each reciprocal movement of the valve-like piston 264. That is to say, it is not until the caps 297 are pulled away from the fingers 288 of the positionable plate 287 that the valve 265 is closed which initiates the ejection action of the valve-like piston 264.

The shaft 124 which is responsive to the differential pressure between the two bellows 145 and 146 and the movement of the shaft 124 is arranged through the motion transmitting means 228 to govern the position of the positionable plate 287 and the flow of liquid from the metering device. The flange 151 on the uppermost portion of the housing 150 of the motion transmitting means 228 is arranged to be connected to the bottom of the bracket which supports the two bellows 145 and 146. As illustrated, a shaft seal 152 seals the housing 150 from the outside. The lower end of the shaft 124 is arranged to be supported by a ball bearing 153 and the upward axial movement of the shaft 124 is opposed by a thrust bearing 154. Anchored to the lower end of the shaft 124 is a hollow spline 155 which slidably receives a shaft spline 156 to which is attached a shaft 160 that actuates a slidable and rotatable plunger 159 within a rotatable casing 158. The slidable and rotatable plunger 159 is urged downward by means of a spring 161 acting against a spring plate 162 which is constrained against the slidable and rotatable plunger 159 through ball bearings 163. By this construction the slidable and rotatable plunger 159 may rotate relative with the spring plate 162 without any friction because the ball bearings 163 provide a minimum amount of friction therebetween. The spring 161 upon its uppermost end rests against the underneath side of the upper end portion 164 of the rotatable casing 158. The upper side of the upper end portion 164 is provided with an annular race way surface 165 against which rides two diametrically opposed rollers 166 which are carried by the shaft 160. The master valve 157 is shown in Figures 6 and 15, inclusive, and as there illustrated the annular race way surface 165 is provided with two diametrically opposed low points 167 into which the rollers 166 reside in their normal and neutral position. The upper side of the upper end portion 164 of the rotatable casing 158 is likewise provided with annular gear teeth 170 which are engaged by a gear 171 actuated by a shaft 172 driven by the throttle device 38. The throttle shaft 172 is surrounded by a shaft seal 173 to keep the internal compartment of the master valve 157 sealed from the outside. The shaft seal 173 is held in place by means of a threaded lock nut 175. A threaded cap 174 protects the shaft seal and the lock nut 175 from outside exposure. The outside of the rotatable casing 158 is slightly tapered in an upward direction and fits into the housing 150 which likewise has a complementary tapered internal surface to receive the rotatable casing. As shown, the rotatable casing is urged upwardly into the housing 150 by means of a spring 176 that has its upper end resting against the bottom end 177 of the rotatable casing 158. The lower end of the spring rests against a plate 184 that closes the lower end of the housing 150. Positioned on the bottom of the slidable and rotatable plunger 159 is a clutch 178 having two disc parts which when engaged provide for restraining a shaft 179 which has a pinion gear 180 at the lower end thereof meshing with a member having rack teeth 181. The shaft 179 is provided with a thrust plate 182 formed integrally therewith or otherwise suitably connected thereto and the thrust plate 182 is arranged to prevent axial movement of the shaft 179. One side of the thrust plate rests in the recess formed in the bottom end 177 of the rotatable casing 158 and the other side of the thrust plate 182 rests against a threaded cap 183 threadably engaging the bottom end 177. The rack teeth 181 on the right-hand end thereof are connected to a pilot plunger 185 having pilot valve openings 189 and the left-hand end of the rack teeth 181 is connected to a pilot piston 196 which reciprocally moves within a pilot cylinder 197. The pilot plunger 185 controls the position or movement of a follower plunger 190 which is reciprocally mounted within a cylinder casing 193. The follower plunger 190 and the cylinder casing 193 together with the pilot plunger 185 may be characterized as a fluid pressure follower device which actuates the positionable plate 287. The follower plunger 190 is constrained to the right by means of a spring 191. Extending longitudinally of the follower plunger 190 is a restricted opening 192 which permits fluid to move from the right-hand end of the cylinder casing 193 to the left-hand end thereof. Fluid under pressure is admitted to the cylinder casing 193 through the fluid inlet 294. The pilot valve openings 189 which comprise radial openings in the pilot plunger 185, provide for determining the position of the follower plunger 190 which actuate the positionable plate 287. In a stabilized position of the follower plunger the force resulting from the fluid pressure acting upon the left-hand end of the said plunger together with the exertion of the spring 191 just balances the force resulting from the pressure of the fluid acting upon the right-hand end of the follower plunger. Now let it be assumed that the pilot valve openings 189 are moved to the left upon the movement of the pilot plunger 185 to the left, then the fluid in the left-hand end of the cylinder casing 193 is permitted to escape through the pilot valve openings 189 and thence out through the opening 201 in the left-hand end of the pilot plunger 185 to the exhaust fluid outlet 200 whereupon the fluid flows back to the supply tank 206 as shown in the diagrammatic view in Figure 1 of the drawing. The escape of the fluid from the left-hand end of the cylinder casing 193 through the pilot valve openings 189 causes a fluid pressure drop and as a consequence the follower plunger 190 is urged to the left by the fluid pressure in the right-hand end of the cylinder casing 193. The follower plunger 190 moves to the left until the left-hand thereof aligns itself with the pilot valve openings 189 at which place the follower plunger again becomes stabilized. Under the condition that the pilot valve openings 189 should be moved to the right, in which event the fluid within the left-hand end of the cylinder casing 193 is totally entrapped therein, then the force resulting from the pressure within the left-hand end of the cylinder casing 193 together with the force of the spring 191 is greater than the force resulting from the pressure exerted by the fluid in the right-hand end of the cylinder casing 193 with the result that the follower plunger 190 moves to the right until the left-hand edge thereof again becomes substantially aligned with the pilot valve openings 189. Consequently, the movement of the follower plunger 190 follows the movement of the pilot plunger 185, and the movement is such that the left-hand edge of the follower plunger 190 is always maintained in substantial alignment with the pilot valve openings 189. When the master valve 157 is in its neutral or normal position, that is, the position when the rollers 166 are residing in the low points 167 of the annular race way surface 165, the two engaging discs of the clutch 178 hold the pilot plunger 185 in a fixed position through the pinion gear 180 and the rack teeth 181 with the result that the positionable plate 287 is maintained in a fixed position for controlling the flow of the liquid to the internal combustion engine.

Figure 5:
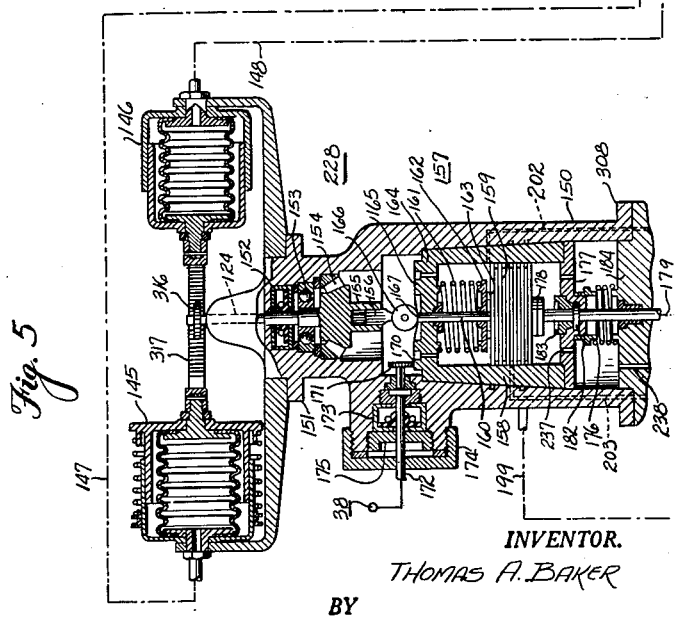
Figure 5 is a cross-sectional view of the motion transmitting means for the liquid metering device shown in Figure 1.

The master valve 157 controls the position of the pilot plunger 185 by governing the flow of the fluid which is admitted to opposite sides of the pilot piston 196 within the pilot cylinder 197. Fluid is admitted under pressure through the fluid inlet 199 to the master valve 157 and through control ports within the master valve 157 fluid is admitted to or exhausted from the pilot cylinder 197 through the fluid ducts 202 or 203. The control of the fluid through the ports within the master valve 157 may best be explained by reference to Figures 6 to 14, inclusive, which show cross-sectional views of the master valve for the various positions which it is caused to assume by the rotation of the shaft 124 from the bellows 145 and 146 or by the shaft 172 from the throttle device 38. The right-hand end of the pilot cylinder 197 is sealed about the shaft by means of a shaft unit 205. In the operation of the master valve it is to be remembered that the rotatable casing 158 is arranged to be rotated with reference to the slidable and rotatable plunger 159 by means of a gear 171 driven by the throttle device 38, and further it is to be remembered that the slidable and rotatable plunger 159 is both reciprocated and rotated with reference to the rotatable casing 158 through means of the shaft 124. Figure 6 shows a cross-sectional view of the master valve which is perpendicular to the view shown in Figure 5 and Figure 7 shows a cross-sectional view taken along the line 7—7 Figure 6 but the outside housing 150 is removed, the main object in showing Figure 7 is to show the relative angular position with respect to the slidable and rotatable plunger 159 with respect to the rotatable casing 158. In the neutral position of the master control valve 157 as shown in Figures 6, 7, and 8, fluid is admitted through the fluid inlet 199 whereupon it flows to an annular groove 233 provided in the housing 150. The rotatable casing 158 is provided with an opening 234 which admits the fluid to flow into the annular groove 235 around the slidable and rotatable plunger 159. From the annular groove 235 fluid flows through a port 236 into the space upon the right-hand end of the slidable and rotatable plunger 159, after which the fluid may flow through the opening 237 in the bottom end 177 of the rotatable casing 158 and thence through the opening 238 out through the fluid outlet 200 whereupon the fluid flows through the supply tank 206, see Figures 1, 5, 6, and 8. From the compartment on the right-hand end of the slidable and rotatable plunger 159 the fluid may flow through the port 239 to the left-hand end of the slidable and rotatable plunger 159 and then out through a port 249 in the rotatable casing 158 to an annular groove 245 in the housing 150, after which the fluid flows through the duct 202 to the right-hand side of the pilot piston 196. Fluid may also flow to the left-hand side of the pilot piston 196 through a fluid circuit which may be traced as follows: Beginning with the port 239 which extends longitudinally through the slidable and rotatable plunger 159, fluid flows into the annular groove 240 and a hole 248 to an annular groove 246 in the housing 150 after which the fluid flows through the duct 203 to the left-hand side of the pilot piston 196. There is substantially no pressure of the fluid on opposite sides of the pilot piston 196 when the master valve 157 is in its neutral or normal position since the fluid may exhaust through the fluid outlet 200. Accordingly, in the neutral or normal position the rack teeth 181 and the pinion gear 180 through the engagement of the clutch 178 hold the pilot plunger 185 in a fixed position which in turn means that the positionable plate 287 is held in a fixed position.

Now let it be assumed that the shaft 124 causes the rollers 166 to be turned in a counter-clockwise direction, thereby turning the slidable and rotatable plunger 159 in a counter-clockwise direction as shown in Figure 10 of the drawing. As the rollers 166 are turned in a counter-clockwise direction they turn on the annular race way surface 165 and as they leave the low point 167 they constrain the slidable and rotatable plunger 159 to the left against the spring 161 and at the same time separate the two disc plates of the clutch 178 which permits the free turning of the pinion gear 180 and the free movement of the rack teeth 181, so that the pilot plunger 185 may be actuated by the pilot piston 196. Under the above assumed condition, fluid is admitted to the right-hand side of the pilot piston 196 for actuating the pilot plunger 185 to the left which means that the follower plunger 190 is likewise hydraulically moved to the left for moving the positionable plate 287 and the metering pistons 264 toward their minimum volume position. Fluid flows to the right-hand side of the pilot piston 196 through a fluid circuit which may be traced as follows: beginning with the fluid inlet 199 of Figure 9, fluid flows through the annular groove 233 and a hole 234 to the annular groove 241, after which fluid flows through the port 242 which extends longitudinally of the slidable and rotatable plunger 159 to a semi-annular groove 243 in the slidable and rotatable plunger 159, see Figure 11. From the semiannular groove 243 fluid flows through a hole 249 in the rotatable casing 158 to the annular groove 245 after which the fluid flows through the duct 202 to the right-hand side of the pilot piston 196 for urging the pilot plunger 185 to the left. The fluid on the left-hand side of the pilot piston 196 is exhausted through the outlet 200 to a circuit which extends from the left-hand side of the pilot piston 196 through the duct 203 through the annular groove 246 in the casing 150, see Figures 5 and 11. From the annular groove 246 fluid flows through the hole 248 to the semiannular groove 244 in the slidable and rotatable plunger 159, after which the fluid flows through the port 239 to the space on the right-hand end of the slidable and rotatable plunger 159, whereupon the fluid flows to the exhaust fluid outlet 200 through the openings 237 and 238, see Figure 5.

The movement of the pilot piston 196 to the left through the fluid pressure follower mechanism repositions the metering pistons 264 which in turn change the amount of the liquid flowing in the engine 33. The repositioning of the metering pistons 264 is moved to such point that the bellows 145 and 146 rotate the two rollers 166 clockwise back to the low point 167 in the annular race way surface 165 at which point the spring 161 urges the slidable and rotatable plunger 159 downwardly in Figure 5 and causes the two discs of the clutch 178 to re-engage for holding the pilot plunger 185 in a fixed position through the pinion gear 180 and the rack teeth 181. Accordingly, the combined action of my opposing bellows, the master valve 157, and the fluid pressure follower mechanism is such that in the event the quantity of the liquid flowing through the duct 259 changes, the metering pistons 264 are repositioned to cause the quantity of liquid to be maintained at a predetermined value or setting as determined by the throttle device 38.

Under the condition that the quantity of liquid flowing through the duct 259 causes the opposing bellows to rotate the shaft 124 in a clockwise direction which is just the reverse from that shown in Figure 10, then the pilot piston 196 is actuated to the right which in turn through the fluid pressure follower mechanism increases the volume delivery of the metering pistons 264. The flow of the fluid to the left-hand side of the piston 196 may be traced as follows: beginning with the fluid inlet 199, fluid flows through the annular groove 233, the hole 234, the annular groove 241 of the slidable and rotatable plunger 159 into the port 242, whereupon the fluid flows to the semi-annular groove 250, the hole 248, the annular groove 246, and the duct 203 to the left-hand side of the pilot piston 196. As the pilot piston 196 moves to the right the fluid in the right-hand end of the pilot cylinder 197 is exhausted out through the fluid outlet 200 to a circuit which extends as follows: beginning with the right-hand end of the pilot cylinder 197, fluid flows through the duct 202, the annular groove 245 in the housing 150, the hole 249 to the semi-annular groove 251 after which the fluid flows through the port 239 and the openings 237 and 238 to the fluid outlet 200. From the above description it is observed that the rotation of the slidable and rotatable plunger 159 in a counter-clockwise direction with reference to the rotatable casing 158 causes the pilot piston 196 to be actuated to the left and the rotation of the slidable and rotatable plunger 159 in a clockwise direction with reference to the rotatable casing 158 causes the pilot piston 196 to be actuated to the right. The change in the direction of the flow of fluid to take care of the two-way operation of the pilot piston 196 is effected through the rotation of the slidable and rotatable plunger 159 whereupon the semi-annular grooves 243, 244, 250 and 251 are caused to be aligned with the holes 248 and 249 in the rotatable casing 158. The slidable movement of the slidable and rotatable plunger 159 takes care of matching of the annular grooves 235 and 241 in the slidable and rotatable plunger 159 with the port 234 of the rotatable casing 158. An annular groove 240 is provided between the semi-annular grooves so that fluid which escapes from the semi-annular grooves along the rotatable casing 158 may flow into the annular groove 240 and the port 239 to exhaust. The action of the master valve is such that the metering pistons 264 are governed to maintain the flow of the fuel through the liquid ducts 54 to the engine 33 at a predetermined value or setting as determined by the throttle 38. The movement of the throttle 38 to a new position rotates the gear 171 and shifts the angular position of the rotatable casing 158 with respect to the slidable and rotatable plunger 159, which in turn causes the master valve 157 to admit fluid to the pilot cylinder 197 for re-positioning the metering pistons 264 through the fluid pressure follower mechanism. The Figures 12, 13, and 14 show the relative position of the rotatable casing 158 and the slidable and rotatable plunger 159, after the rotatable casing 158 has been rotated in a clockwise direction as indicated by the arrow in Figure 13 by the throttle device 38. The rotation of the rotatable casing 158 with respect to the slidable and rotatable plunger 159 produces the same result so far as the alignment of the various grooves and parts in the master valve is concerned, as if the slidable and rotatable plunger 159 were rotated with reference to the rotatable casing 158. Upon the rotation of the rotatable casing 158 in one direction, fluid is admitted to the right-hand side of the pilot piston 196 for reducing the volume delivery of the metering pistons 264 and upon the rotation of the rotatable casing 158 in the opposite direction the master valve admits fluid through the left-hand side of the pilot piston 196 for increasing the volume delivery. The effect produced by rotating the rotatable casing 158 is such as to change the setting of the master valve 157 to produce a corresponding re-positioning of the metering pistons.

Consequently, the amount of fluid ejected from the cylinders 262 upon each reciprocal movement of the valve-like piston 264 is controlled by the throttle device 38. In addition, the differential action of the pressure responsive devices 145 and 146 maintains the volume of each ejection of the valve-like piston 264 in accordance with the amount of fluid flowing through the venturi 260. The flow of the fluid from the venturi to the pressure responsive device 145 is through a duct 147 and the flow of the fluid to the pressure responsive device 146 is through a duct 148.

In Figure 16 I show a modification of the arrangement shown in Figure 5 in that the shaft 124 that actuates the rollers 166 of the master valve 157 is not only responsive to the pressure responsive devices 145 and 146 but is also responsive to a spring biased temperature responsive device 318 which is connected to the feed pipe 259 through a capillary tube 321. The movements of the temperature responsive device 318 are transmitted through a thrust bearing 322 to a variable rotary drive means 113 which is of the same general construction and has the same general operation as the variable rotary drive means 75, 106 and 114 of the air measuring mechanism 35 shown and described in my pending application, Serial No. 459,410, filed September 23, 1942, Patent No. 2,421,003, for Fluid responsive device. The variable drive means 113 comprises a rotor having angularly positioned slots 116 into which fit cross-pins 115 arranged to actuate the shaft 124. The rotor is arranged to rotate on bearings 110 and is actuated by the gear 316 engaging the rack teeth 317. The shaft extending through the gear 316 is not connected to the gear and is disposed to actuate the cross-pins 115 up and down in response to changes in temperature to vary the angular relation between the rotor and the shaft 124. As the cross-pins 115 move up and down, the lower end of the shaft 124 freely slides up and down in a sleeve, but rotational movement of the shaft is transmitted to the sleeve to operate the master valve 157. Consequently, with the addition of the temperature responsive device 318 as shown in Figure 16, the shaft 124 is positioned by the rotor as a function of the amount of liquid which flows through the liquid metering device 53 as compensated for temperature changes in order to give an absolute value for the flow of the fluid to the internal combustion engine. The end of the tube 321 is provided with a bulb 323 and the tube and bulb and the bellows of the temperature responsive device 318 are filled with an expansible fluid which measures the temperature of the fluid at the pipe 259.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A variable capacity pump comprising, in combination, a pump chamber, means for entrapping fluid in said pump chamber and discharge same therefrom, variable means associated with the pump chamber for varying the amount of fluid entrapped in and discharged from said chamber, positionable means for operating the variable means through a range of positions to govern the quantity of fluid flowing into and out of the pump chamber, first control means responsive to the quantity of fluid flowing to the pump chamber, operable control means, fluid pressure actuating means for governing the moving and the repositioning of the positionable means, fluid valve means including a fluid valve having two relatively movable parts for controlling the fluid pressure actuating means, means for actuating one of said valve parts by the first control means and for actuating the other of said valve parts by the operable control means, whereby said fluid pressure actuating means and the positionable means are governed both by the fluid flowing into the pump chamber and by the operable control means.

2. A variable capacity fluid device comprising, in combination, a fluid chamber having an entrance and an exit, variable means associated with the fluid chamber for varying the amount of fluid entering said chamber and flowing therefrom, positionable means for operating the variable means through a range of positions to govern the quantity of fluid flowing into and out of the fluid chamber, first control means responsive to the quantity of fluid flowing to the fluid chamber, operable control means, fluid pressure actuating means for governing the moving and the repositioning of the positionable means, fluid valve means including a fluid valve for controlling the fluid pressure actuating means, means for actuating one of said valve parts by the first control means and for actuating the other of said valve parts by the operable control means, whereby said fluid pressure actuating means and the positionable means are governed both by the fluid flowing into the fluid chamber and by the operable control means.

3. A variable capacity fluid device comprising, in combination, a fluid chamber having an entrance and an exit, variable means associated with the fluid chamber for varying the amount of fluid entering said chamber and flowing therefrom, positionable means for operating the variable means through a range of positions to govern the quantity of fluid flowing into and out of the fluid chamber, first control means responsive to the quantity of fluid flowing to the fluid chamber, operable control means, fluid pressure actuating means for governing the moving and the repositioning of the positionable means, fluid valve means including a fluid valve for controlling the fluid pressure actuating means, means for actuating one of said valve parts by the first control means and for actuating the other of said valve parts by the operable control means, whereby said fluid pressure actuating means and the positionable means are governed both by the fluid flowing into the fluid chamber and by the operable control means, and temperature means responsive to the temperature of the fluid flowing into the fluid chamber for modifying the first control means.

4. A variable capacity pump comprising, in combination, a pump chamber, means for entrapping fluid in said pump chamber and discharge same therefrom, variable means associated with the pump chamber for varying the amount of fluid entrapped in and discharged from said chamber, positionable means for operating the variable means through a range of positions to govern the quantity of fluid flowing into and out of the pump chamber, a movable control element for governing the positionable means, fluid means including a valve for controlling the position of the control element, said valve having a casing with a first and a second valve part therein, said valve parts being movable relative to each other, said fluid means with said valve parts in a first relative operative position actuating said control element in one direction and with said valve parts in a second relative operative position actuating said control element in the opposite direction and with said valve parts in a third relative neutral position arresting the control element, clutch means interconnecting said second valve part and said control element for holding said control element in an arrested position when said valve parts are in a neutral position, operable control means for operating said first valve part to vary the relative operative position of the valve parts from said neutral position for causing the control element and the positionable means governed thereby to shift the variable means for varying the flow of fluid, means responsive to said valve parts for disengaging the clutch means when said valve parts move from said relative neutral position to thereby allow the control element and the positionable means to shift the variable means for varying the flow of fluid, first control means responsive to the quantity of fluid flowing to the pump chamber, means for actuating said second valve part by the first control means to restore said valve parts to said neutral position and to re-engage said clutch means to arrest the shifting movement of said variable means and thereafter to hold said variable means at the new position as determined by the setting of the operable control means.

5. A variable capacity fluid device comprising, in combination, a fluid chamber having an entrance and an exit, variable means associated with the fluid chamber for varying the amount of fluid entering said chamber and flowing therefrom, positionable means for operating the variable means through a range of positions to govern the quantity of fluid flowing into and out of the fluid chamber, a movable control element for governing the positionable means, fluid means including a valve for controlling the position of the control element, said valve having a casing with a first and a second valve part therein, said valve parts being movable relative to each other, said fluid means with said valve parts in a first relative operative position actuating said control element in one direction and with said valve parts in a second relative operative position actuating said control element in the opposite direction and with said valve parts in a third relative neutral position arresting the control element, clutch means interconnecting said second valve part and said control element for holding said control element in an arrested position when said valve parts are in a neutral position, operable control means for operating said first valve part to vary the relative operative position of the valve parts from said neutral position for causing the control element and the positionable means governed thereby to shift the variable means for varying the flow of fluid, means responsive to said valve parts for disengaging the clutch means when said valve parts move from said relative neutral position to thereby allow the control element and the positionable means to shift the variable means for varying the flow of fluid, first control means responsive to the quantity of fluid flowing to the pump chamber, means for actuating said second valve part by the first control means to restore said valve parts to said neutral position and to re-engage said clutch means to arrest the shifting movement of said variable means and thereafter to hold said variable means at the new position as determined by the setting of the operable control means.

6. A variable capacity fluid device comprising, in combination, a fluid chamber having an entrance and an exit, variable means associated with the fluid chamber for varying the amount of fluid entering said chamber and flowing therefrom, positionable means for operating the variable means through a range of positions to govern the quantity of fluid flowing into and out of the fluid chamber, a movable control element for governing the positionable means, fluid means including a valve for controlling the position of the control element, said valve having a casing with a first and a second valve part therein, said valve parts being movable relative to each other, said fluid means with said valve parts in a first relative operative position actuating said control element in one direction and with said valve parts in a second relative operative position actuating said control element in the opposite direction and with said valve parts in a third relative neutral position arresting the control element, clutch means interconnecting said second valve part and said control element for holding said control element in an arrested position when said valve parts are in a neutral position, operable control means for operating said first valve part to vary the relative operative position of the valve parts from said neutral position for causing the control element and the positionable means governed thereby to shift the variable means for varying the flow of fluid, means responsive to said valve parts for disengaging the clutch means when said valve parts move from said relative neutral position to thereby allow the control element and the positionable means to shift the variable means for varying the flow of fluid, first control means responsive to the quantity of fluid flowing to the pump chamber, means for actuating said second valve part by the first control means to restore said valve parts to said neutral position and to re-engage said clutch means to arrest the shifting movement of said variable means and thereafter to hold said variable means at the new position as determined by the setting of the operable control means, and temperature means responsive to the temperature of the fluid flowing into the fluid chamber for modifying the first control means.

7. A variable capacity fluid device comprising, in combination, a fluid chamber having an entrance and an exit, variable means associated with the fluid chamber for varying the amount of fluid entering said chamber and flowing therefrom, positionable means for operating the variable means through a range of positions to govern the quantity of fluid flowing into and out of the fluid chamber, a movable control element for governing the positionable means, fluid means including a valve for controlling the position of the control element, said valve having a casing with a first and a second valve part therein, said valve parts being movable relative to each other, said fluid means with said valve parts in a first relative operative position actuating said control element in one direction and with said valve parts in a second relative operative position actuating said control element in the opposite direction and with said valve parts in a third relative neutral position arresting the control element, operable control means for operating said first valve part to vary the relative operative position of the valve parts from said neutral position for causing the control element and the positionable means governed thereby to shift the variable means for varying the flow of fluid, first control means responsive to the quantity of fluid flowing to the pump chamber, means for actuating said second valve part by the first control means to restore said valve parts to said neutral position to arrest the shifting movement of said variable means and thereafter to hold said variable means at the new position as determined by the setting of the operable control means.

THOMAS A. BAKER.

REFERENCES CITED

The following references are of record in the file of this patent:

UNITED STATES PATENTS

| Number | Name | Date |
|---|---|---|
| 1,934,108 | Walker | Nov. 7, 1933 |
| 1,939,603 | Bernard | Dec. 12, 1933 |
| 2,130,299 | Ernest | Sept. 13, 1938 |
| 2,187,151 | Gillen | Jan. 16, 1940 |
| 2,214,390 | Wahlmark | Sept. 10, 1940 |
| 2,283,242 | Van Der Walt | May 19, 1942 |
| 2,299,234 | Snader | Oct. 20, 1942 |